(12) United States Patent
Wills et al.

(10) Patent No.: US 6,307,501 B1
(45) Date of Patent: Oct. 23, 2001

(54) RADAR SYSTEMS

(75) Inventors: Robert W Wills, Newport; Jonathan H Baker, Gurnard, both of (GB)

(73) Assignee: Bae Systems (Defence Systems) Limited, Farnborough (GB)

( * ) Notice: Subject to any disclaimer, the term of this patent is extended or adjusted under 35 U.S.C. 154(b) by 0 days.

(21) Appl. No.: 09/447,737

(22) Filed: Nov. 23, 1999

(30) Foreign Application Priority Data

Feb. 26, 1998 (GB) ..................................................... 9803906

(51) Int. Cl.$^7$ .............................. G01S 7/292; G01S 13/00
(52) U.S. Cl. .......................... 342/161; 342/159; 342/160; 342/162; 342/195
(58) Field of Search .................................. 342/160–175, 342/192–197

(56) References Cited

U.S. PATENT DOCUMENTS 4,068,231  1/1978  Wilmot .

FOREIGN PATENT DOCUMENTS

| 0 069 415 | 1/1983 | (EP) . |
| 1285508 | 8/1972 | (GB) . |
| 2055524 | 3/1981 | (GB) . |
| 2-213787-A | * 8/1990 | (JP) ................................. G01S/7/292 |

OTHER PUBLICATIONS

Myers, et al "Processing Techniques for Surface Surveillance Radars in Littoral Environments," IEEE International Radar Conference, (1995 IEEE), pp. 33–38.

* cited by examiner

Primary Examiner—Bernarr E. Gregory
(74) Attorney, Agent, or Firm—Nixon & Vanderhye P.C.

(57) ABSTRACT

In a radar system it is necessary to distinguish signals reflected from wanted targets such as aircraft from those reflected from fixed terrain features, known as clutter. The clutter signals can in some cases be significantly stronger than the wanted signals. One method for dealing with land clutter is the use of a high resolution clutter map. The area around the radar is considered to be divided into cells, and an array of background signal estimates is maintained for these cells. Whenever a signal is received by the radar, it is compared with the stored background level for the cell it occupies, and a detection is only reported if the signal exceeds the background by a pre-set threshold. Received signals are also used to modify the stored background levels so that the clutter map adapts to the reflections from clutter which are present over long periods. Clutter maps have so far only been used successfully for radars at fixed locations. In the case of a ship-borne radar near land, a conventional clutter map will not work well. This is because as the ship moves, the positions of land scatterers relative to the ship will not be fixed. Individual terrain features will therefore be moved from one clutter map cell to another. In the cell into which a strong scatterer moves, the land clutter reflections will be reported as targets until the stored background has had time to adapt to the new higher level. Similarly, in the cell which the scatterer has left, the stored background level will be higher than necessary, and may cause actual targets to be suppressed until it has had time to adapt to the new lower clutter level.

6 Claims, 2 Drawing Sheets

RADAR SYSTEMS

BACKGROUND OF THE INVENTION

1. Field of the Invention

The present invention relates to radar systems and in particular to the suppression of unwanted signals received by a radar system which have been reflected from fixed objects (clutter) such as terrain features and buildings, in the case when the radar is mounted on a moving platform such as a ship.

2. Discussion of Prior Art

A radar system operates by transmitting electromagnetic signals and receiving these same signals after they have been reflected from targets. However, besides the reflections from the wanted targets, e.g. aircraft, other reflections from unwanted objects occur. These unwanted objects are referred to as clutter, and may include terrain features such as hillsides and cliffs, man made objects such as buildings and fences, and weather phenomena such as rain. The unwanted reflections may in some cases be greater than the reflections from targets.

Methods for suppressing the unwanted reflections and retaining only signals from targets generally rely on the fact that the clutter objects are stationary or only slowly moving. Many radars employ Moving Target Indication (MTI) or Moving Target Detection (MTD), which rely on determining the radial component of the target's velocity (towards or away from the radar) by examining the Doppler shift of the received signal. Suppressing signals which do not have a significant Doppler shift ensures that only fast moving objects are shown as targets. However, this does not completely solve the problem because some targets may have zero radial speed even if they are moving rapidly in a direction tangential to the radar. These wanted targets exhibit low Doppler shifts and are therefore suppressed along with the clutter if only MTI or MTD methods are used.

An alternative approach, which complements MTI and MTD processes used in many radar systems, is to vary the sensitivity of the radar receiver so that areas which are found to return strong signals are examined with lower sensitivity than areas which do not. This involves using a clutter map, in which the radar coverage area is divided into cells and an array of background signal estimates for these cells is stored. Received signals are then only accepted as being from wanted targets if they exceed the stored background level for the cell they occupy by a sufficient factor: if s is the received signal strength and $b_i$ is the background level stored in the cell, a detection is reported if $s > k_T b_i$, for some fixed ratio $k_T$.

The background estimates throughout the map are modified on each scan of the radar so that they gradually converge to the signal levels actually being received. Reflections from fixed scatterers therefore 'build-in' to the map and are eventually suppressed. Moving targets, on the other hand, are detected whenever their reflections exceed the levels stored in the clutter map cells they temporarily occupy. If the map cells are small enough, moving targets will not remain in the same cells long enough to 'build-in' and affect the stored levels. The operation of clutter maps for stationary radars has been fully described in the literature by M I Skolnik, Radar Handbook, McGraw Hill Book Company, 1978.

The background estimate in each clutter map cell is normally accumulated by '$\alpha$ smoothing'. If $b_i$, is the current clutter background level in the ith cell, and the greatest level seen in the cell during the current scan is $g_i$, the following expression is used to compute the new background level to be used for the next scan period:

$$(1-\alpha)b_i + \alpha g_i$$

where $\alpha$ is a small number, typically $\frac{1}{8}$ or $\frac{1}{16}$.

The above description of clutter map operation has assumed that a clutter map has already been set up when radar data is received. It is also necessary to consider the problem of initialisation: filling the clutter map with suitable data when the radar is first switched on. If this is done incorrectly, it is possible for many false detections to be reported on the first few scans, due to low initial values of $b_i$ causing the condition $s > k_T b_i$ to be frequently met.

The operation of the clutter map described above clearly depends on the clutter scatterers being stationary with respect to the radar. For this reason, clutter maps have to date only been successfully applied to radar systems operating at fixed locations. A radar mounted on a moving platform, such as a ship or aircraft, will observe clutter which is moving relative to itself. Clutter objects will then move from one clutter map cell to another. Such scatterers will be reported as detections whenever they move into a new clutter map cell which has a low stored background value. Eventually, if the scatterer remains in the cell, the background in the new cell will be raised to prevent this, but the adaption may require a few scans. Also, the cell the scatterer was previously in will be left for a number of scans with an unnecessarily high threshold, which may cause wanted targets to be suppressed. If the radar motion is sufficiently fast, such problems will occur continuously, causing many false detections and loss of target detections.

SUMMARY OF THE INVENTION

An aim of the present invention is to provide an improved radar system which overcomes the above mentioned problems.

According to the present invention there is provided a method of operating a radar system mounted on a moving platform comprising the steps of:

compensating for movement of the platform to retain fixed terrain features within the same cell of a clutter map, periodically re-centring the clutter map to maintain its origin of co-ordinates close to an actual position of the platform, and, accelerating an initialisation time of the clutter map so that the step of recentring is achieved a sufficient number of times during rapid movement of the platform.

The method may also include the step of updating the clutter map cell background levels in combination with a detection process to reduce computational load.

The present invention enables compensation of motion to be incorporated into the operation of the clutter map, so that it can still be used effectively when the radar is not stationary.

The clutter map described has four new features which enable it to operate successfully even when the radar is in motion. These are:

Compensation of radar movement.
Periodic re-centring of clutter map.
Fast initialisation following re-centring.
Continuous background level update.

Compensation of ship movement is carried out by adding the known ship position to the location of scatterers before determining which clutter map cell they occupy. It is assumed that the ship position is supplied to the radar on a continuous basis.

A clutter map in polar co-ordinates with stored position offset needs to be re-centred at intervals so that the origin of the polar co-ordinates is kept near the ship position.

This is done by maintaining two maps, one of which is being initialised whilst the other is in use. Every time either of the maps is re-initialised, it is recentred so that its origin coincides with the current ship position.

The need to initialise both maps at frequent intervals means that the initialisation must be carried out in as few scans as possible. The present invention incorporates a way to accelerate the initialisation process, enabling clutter reflections to 'build-in' to the map as quickly as possible.

Finally, the process of allowing the observed clutter returns to contribute to the stored background levels has been integrated with the algorithm for determining target detections. This renders the computation involved more efficient and eliminates the need for a special update activity once per radar scan.

The most obvious advantage of the invention is that it eliminates the problems described above when unwanted scatterers move from one clutter map cell to another. This movement is now prevented: objects which are truly stationary will always occupy the same clutter map cell even when the radar moves.

The accelerated initialisation scheme also means that the clutter map deals better with reflections from features which are initially hidden behind nearer terrain, but are revealed as the radar moves. Such revealed objects build quickly into the clutter map.

BRIEF DESCRIPTION OF THE DRAWINGS

An embodiment of the present invention will now be described with reference to the accompanying drawings, wherein.

DETAILED DISCUSSION OF PREFERRED EMBODIMENTS

Figure 1:
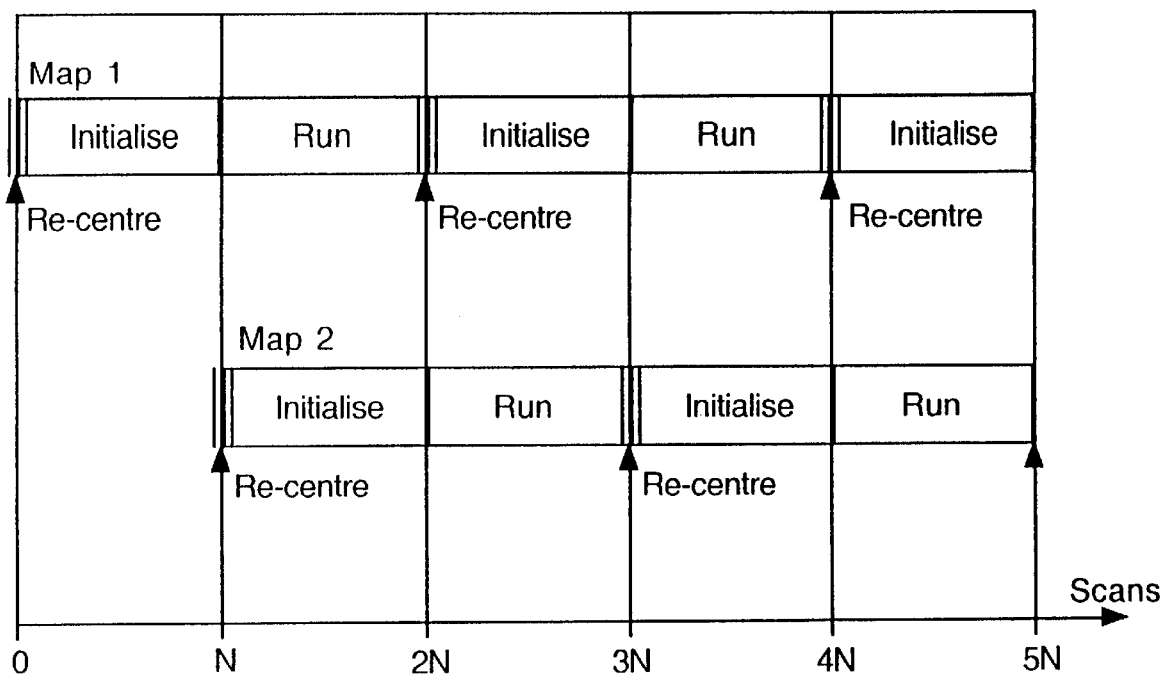
FIG. 1 shows an initialisation method with two clutter maps.

The four improvements in accordance with the present invention will now be described in detail.

Compensation of radar movement

Compensation is made for the movement of the radar platform by storing the platform starting position, and taking this as the origin of co-ordinates. At later times the new platform position is computed as an offset from the starting position and stored. Whenever a reflected signal is received, this offset is added to the position of the scatterer, and the resulting corrected position is used to define its location in the clutter map.

Storing the offset is done as follows. Suppose the ship's motion is known and defined by $(x_0(t), y_0(t))$ at time t. Platform motion is then taken into account by using $(x+x_0(t), y+y_0(t))$ as the position of the clutter map.

The clutter map cell number can then be computed, and the method for doing this is dependent on the co-ordinate system in use for the map. The present invention is not dependent on the co-ordinate system in use of a particular co-ordinate system, but can be implemented using polar co-ordinates. As examples of computing the clutter map cell number, the procedure for polar and Cartesian co-ordinates will now be described.

A polar grid will normally use equal azimuth spacings. Range and spacing might be uniform, or smaller at close ranges where most range resolution is required. Given the position as range R and asimuth angle θ, the following computations are required to determine the index number of the clutter map cell within which the position lies:

Corrected position $x'=R \sin \theta + x_0(t)$
$y'=R \cos \theta + y_0(t)$
$R'=\sqrt{x'^2+y'^2}$
$\theta=\arctan(x', y')$ (using two-argument arctan)

Azimuth cell no. $i_\theta=[\theta'/\Delta\theta]$ where $\Delta\theta$=cell size in azimuth.

Range cell no. $i_R=[R'/\Delta R]$ for equally spaced grid, cell size $\Delta R$.

$i_R$ such that $R_{i_R-1} \leq R \leq R_{i_R}$ for unequal spacing.

Cell no. $i=i_\theta+i_R N_\theta$

In Cartesian co-ordinates a square grid may be assumed. Cell number for grid spacing $\Delta$ can be calculated as:

Corrected position $x'=R \sin \theta + x_0(t)$
$y'=R \cos \theta + y_0(t)$
"x" cell no. $i_x=[x'/\Delta]$
"y" cell no. $i_y=[y'/\Delta]$
Cell no. $i=i_x+i_y N_x$ With either of these schemes, a clutter scatterer with fixed position will always remain within the same clutter map cell, yielding the advantages described above.

Periodic re-centring of clutter map

A clutter map with motion compensation starts with its origin at the radar position, but after some time this will no longer be the case. With a clutter map arranged according to Cartesian components this is not serious provided the map edges are made to wrap around, but a polar clutter map must be periodically recentred. With large position offsets, there is a danger that the clutter map cells no longer have the correct shape to provide good range resolution and inter-clutter visibility. Cells off to the side of the movement direction will be rotated and effectively extended in range, which is undesirable, since clutter scatterers at cell edges may now fall in adjacent cells leading to unwanted radar detections.

Figure 2:
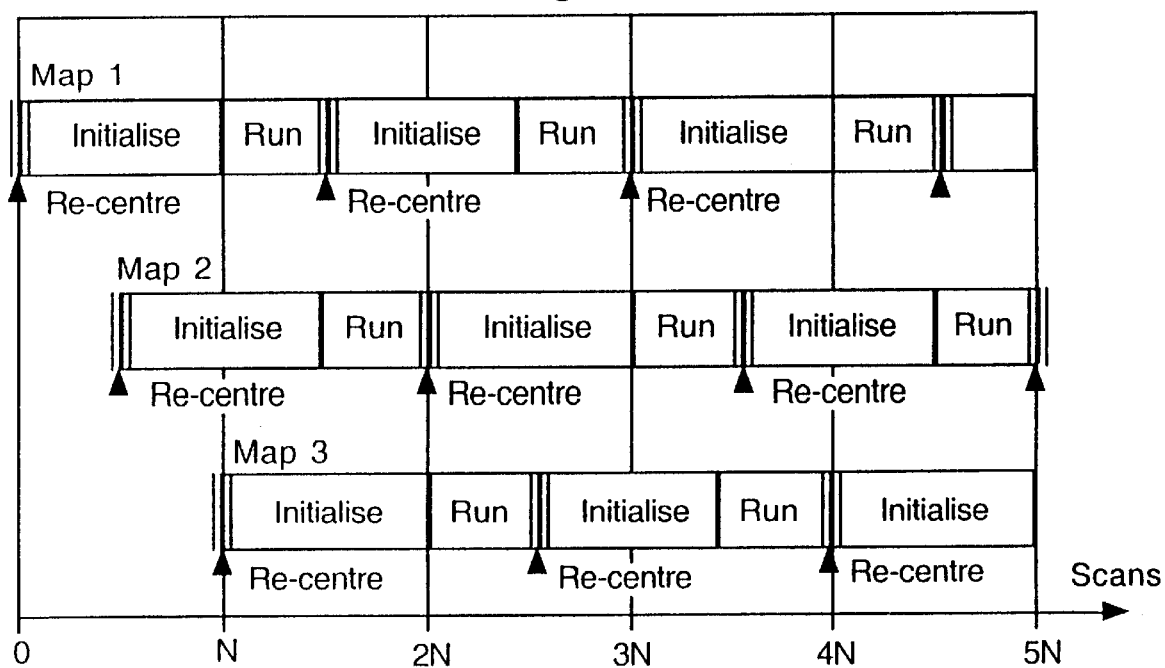
FIG. 2 shows an initialisation method with three clutter maps.

During initialisation, the data in the clutter map is not useful for determining radar detections, so in the present invention two clutter maps are employed: one to be initialising whilst the other is in use. The timing of the usage of the two clutter maps would be as shown in FIG. 1. On the first radar scan, map 1 has its origin set to the ship position. It is then allowed to initialise during a fixed number of scans N. After this, map 2 has its origin set to the ship position while map 1 is brought into use. During the next N scans, map 2 is initialised. Then map 1 is reset and starts initialising whilst map 2 is in use, and so on. The present invention does not exclude the use of more than two clutter maps. For example, the Scheme using three maps may be used as shown in FIG. 2.

Fast initialisation following re-centring

Figure 3:
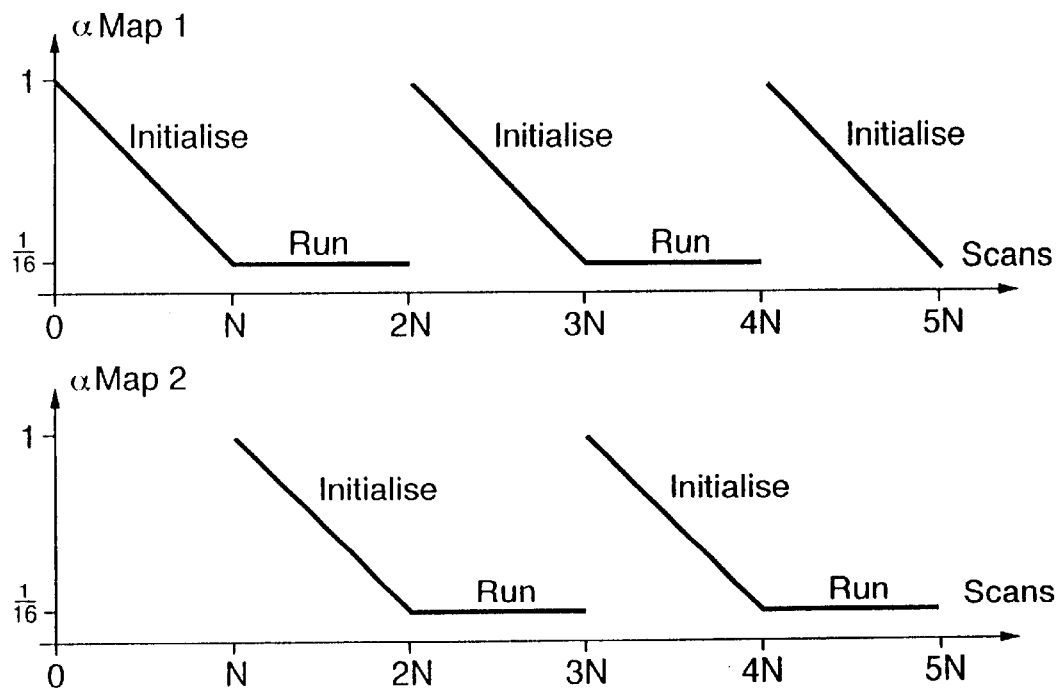
FIG. 3 shows a variable smoothing parameter with two clutter maps.

In the scheme with two clutter maps shown in FIG. 1, it is necessary to be able to initialise the clutter maps and have them already settled at the end of N scans. If the clutter map is filled with a constant receiver noise level, normal $\Delta$ smoothing as described above is not always sufficient to allow it to 'settle' before it is brought into use. Therefore, the present invention employs an accelerated Δ smoothing. This involves setting Δ=1 on the first scan, so that the map is filled with whatever clutter values are present, and allowing it to reduce to its proper value, e.g. 1/16 by the Nth scan. A linear variation of Δ is shown in FIG. 3, although the present invention does not preclude the use of a more complicated variation law.

Continuous background level update

Conventionally, the Δ smoothing for updating the cell background levels is carried out once per scan. In the present invention this computation is combined with the detection reporting process. This is done by also storing the time of last update with the largest return for each cell. When reference is made to the cell to determine whether a received signal is great enough to represent a target detection, the stored time of last update is checked to see whether the background level stored in the cell must first be Δ smoothed. This approach is applicable to any map co-ordinate system. The algorithm for doing this is as follows:

Let t=current time
   s=current received signal
   i=number of clutter cell it falls in
   $b_i$=stored background level in cell i
   $g_i$=greatest return seen in cell i
   $t_i$=time at which $g_i$ was stored.

On receiving signals at time t
   Compute cell number i as above
   Report detection if $s>k_T b_i$
   if $t-t_i$ is less than a scan time
     then ($t_i$ was in the current scan)
       $g_i := \max\{g_i, s\}$
     else ($t_i$ was in the last scan)
       $b_i := (1-\Delta) b_i + \Delta g_i$
       $g_i := s$
       $t_i := t$
   end if By virtue of this continuous updating strategy, the invention is not restricted to conventional rotating radars. It applies also to the case of a Multi-Function Radar (MFR), in which the beam may be scanned electronically with great freedom. The map updating scheme relies only on all map cells being visited often enough to keep the data in them valid. The requirement for an MFR to carry out regular surveillance of the entire coverage volume would ensure that this was the case. During tracking, concentration of radar looks into a small volume expected to contain the target could be expected to yield clutter map data of even higher quality within this volume.

The invention may be embodied as part of the radar signal processing hardware, by means of one or several boards containing suitable processors.

Figure 4:
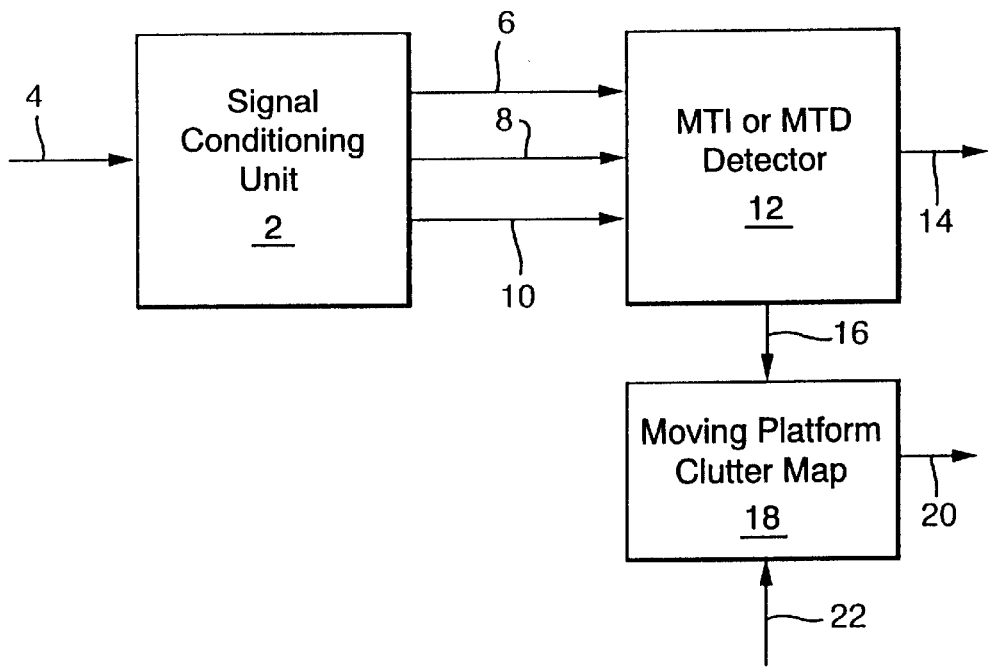
FIG. 4 shows a block diagram of apparatus for implementing the method.

A block diagram of one implementation will now be described with reference to FIG. 4.

A signal conditioning unit 2 receives radar signal at Intermediate Frequency (IF) on line 4. The conditioning unit 2 generates inphase, quadrature phase and modulus signals on lines 6, 8 and 10 respectively. The signals are applied to a digital MTI or MTD detector 12 which outputs the MTI or MTD detections oil line 14. Normal radar signals from the MTI or MTD detector 4 are passed over line 16 to the moving platform clutter map 18, which also receives signals over line 22 which report the geographical position of the moving platform. The normal radar signals are outputted from the moving platform clutter map over line 20.

As mentioned above, the moving platform is a ship, but it may be an aircraft or any other form of transportation means.

What is claimed is:

1. A method of operating a radar system mounted on a moving platform comprising the steps of:

compensating for movement of the platform to retain fixed terrain features within the same cell of a clutter map, periodically re-centering the clutter map to maintain its origin of co-ordinates close to an actual position of the platform, and, accelerating an initialization of the clutter map so that the step of re-centering is achieved a sufficient number of times during rapid movement of the platform.

2. A method as claimed in claim 1, which further includes the step of updating the clutter map cell background levels in combination with a detection process to reduce computational load.

3. A method as claimed in claim 2, wherein the step of updating the clutter map cell background levels in combination with a detection process further comprising the steps of, storing the time of the last update with the largest return for each cell of the clutter map, referring to the appropriate cell to determine whether a received signal is sufficiently large to represent a target detection, and, checking the stored time of the last update to ascertain whether the background level stored in the cell must be subjected to smoothing.

4. A method as claimed in claim 1, where the step of compensating for movement further comprises the steps of, ascertaining and storing the platform starting position, computing and storing subsequent positions of the platform as an offset from the starting position, upon receiving a reflected signal, adding the current offset to the position of the scatterer which reflected the signal, and, using the result of the addition to define the location of the scatterer in the clutter map.

5. A method as claimed in claim 1, wherein the step of periodically re-centering the clutter map uses at least two clutter maps, and comprises the further steps of, setting the origin of the first clutter map to the position of the,platform on a first radar scan cycle, initializing the first clutter during a fixed number of radar scan cycles, setting the origin of a second clutter map to the position of the platform while the first clutter map is brought into use, initializing the second clutter map during a next fixed number of radar scan cycles, re-setting and re-initializing the first clutter map while the second clutter map is in use, and, continuously repeating said further steps.

6. A method as claimed in claim 5, wherein the accelerating step utilizes an α smoothing algorithm and further comprises the steps of, setting the value of α to the value which is substantially greater than its normal value on a first radar scan cycle, and, allowing the value of α to reduce to its normal value by the end of the fixed number of radar scan cycles.

\* \* \* \* \*